March 17, 1936. A. KOTTMANN 2,034,345

CALCULATING MACHINE

Filed June 1, 1934 7 Sheets-Sheet 1

Fig. 1.

Inventor:
August Kottmann
By [signature]
Attorney

March 17, 1936.  A. KOTTMANN  2,034,345
CALCULATING MACHINE
Filed June 1, 1934   7 Sheets-Sheet 2

Inventor:
August Kottmann

March 17, 1936. A. KOTTMANN 2,034,345
CALCULATING MACHINE
Filed June 1, 1934   7 Sheets-Sheet 3

Inventor:
August Kottmann
By [signature]
Attorney.

March 17, 1936.  A. KOTTMANN  2,034,345

CALCULATING MACHINE

Filed June 1, 1934  7 Sheets-Sheet 4

Inventor:
August Kottmann
By [signature]
Attorney.

March 17, 1936.  A. KOTTMANN  2,034,345

CALCULATING MACHINE

Filed June 1, 1934   7 Sheets-Sheet 5

Inventor:
August Kottmann
By (signature)
Attorney

March 17, 1936.  A. KOTTMANN  2,034,345
CALCULATING MACHINE
Filed June 1, 1934  7 Sheets-Sheet 6

Inventor:
August Kottmann
By
Attorney.

March 17, 1936.　　　A. KOTTMANN　　　2,034,345
CALCULATING MACHINE
Filed June 1, 1934　　　7 Sheets-Sheet 7

Inventor:
August Kottmann
By
Attorney.

Patented Mar. 17, 1936

2,034,345

UNITED STATES PATENT OFFICE 2,034,345

CALCULATING MACHINE

August Kottmann, Sommerda, Thuringia, Germany, assignor to Rheinische Metallwaaren- und Maschinenfabrik Soemmerda Aktiengesellschaft, Sommerda, Thuringia, Germany, a corporation of Germany Application June 1, 1934, Serial No. 728,603
In Germany June 6, 1933

9 Claims. (Cl. 235—60)

This invention relates to calculating machines and has for its main object to provide a ten key calculating mechanism for such machines which shall be reliable and positive in its operation.

The invention will be described with reference to the accompanying drawings.

Figure 1:
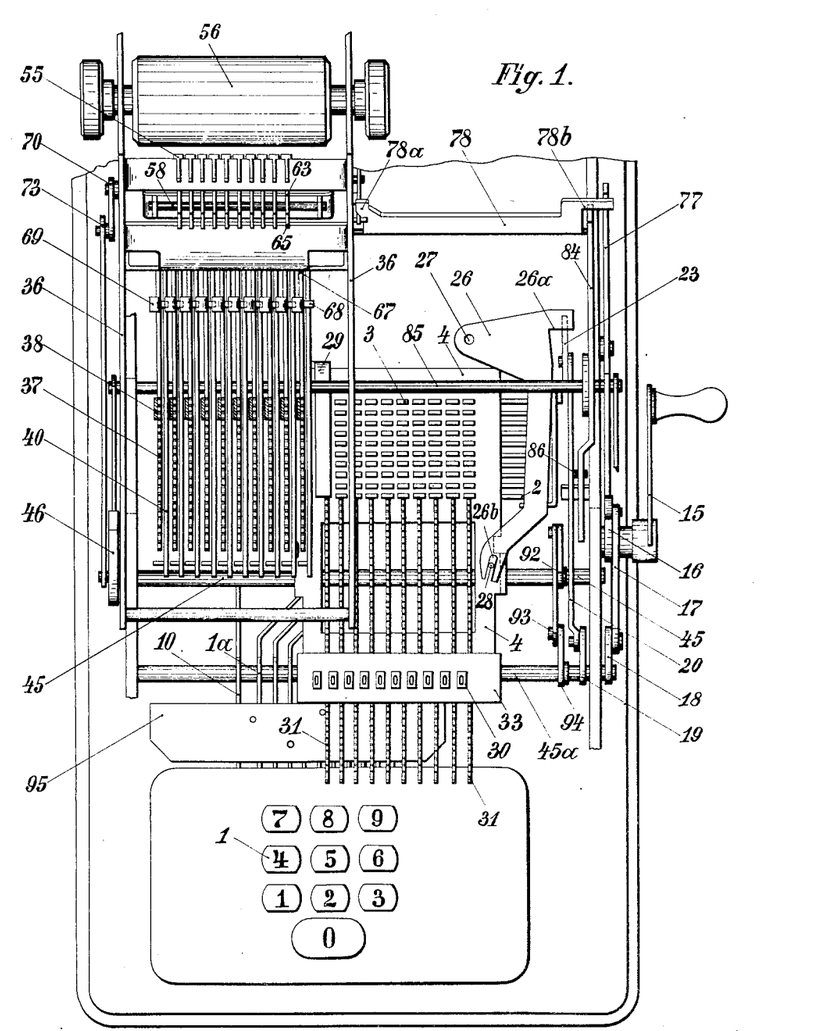
Fig. 1 shows the calculating machine according to the invention, the cover plates and accumulator being removed.
Figure 2:
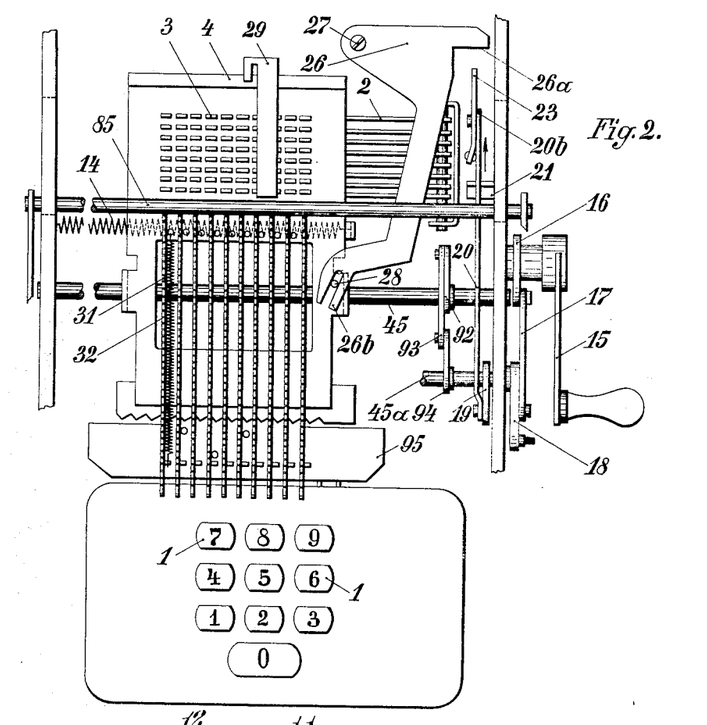
Fig. 2 is a plan of the pin carriage and item entry devices.

The numerical values to be introduced into the machine are introduced in known manner, by means of the keys 1 (Figs. 1 and 6), key levers 1a and intermediate levers 2, into the setting pins 3 of the carriage 4. The setting pins thus raised serve as stops for racks forming the setting members 31, which are mounted in guide notches of the carriage 4, and, in being set, actuate at the same time indicating wheels 30 which are also mounted on said carriage. The number of setting members 31 is the same as that of the rows of setting pins 3. When any of the keys is struck, the corresponding key lever 1a depresses a lever 10 (Figs. 6 and 8) which by means of a lug 35 releases a pawl 34 engaging the corresponding setting member 31. Said member 31, which was previously retained in the neutral position by the pawl 34, is then free to be actuated by a spring 32 (Fig. 2) and moves towards the left (Figs. 6 and 8) until its end bears against a simultaneously raised setting pin 3, thus setting the member 31.

Figures 3, 4, 5:
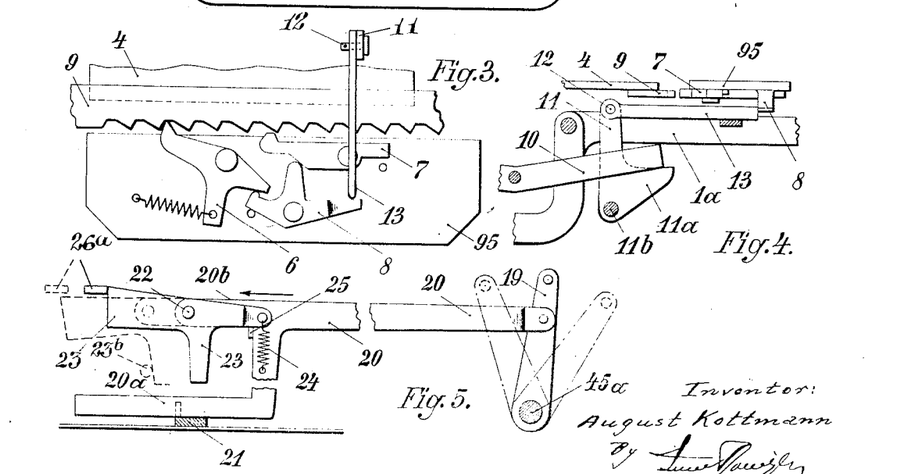
Fig. 3 is a view, from below, showing the escapement mechanism for the pin carriage.
Fig. 4 is a side elevation of the members for actuating the escapement mechanism.
Fig. 5 shows the actuating device for the return stroke of the carriage.

By means of an escapement mechanism 6, 7, 8 (Fig. 3) which acts on a rack 9 on the carriage 4 and is mounted on a plate 95 of the machine frame, the carriage 4 is allowed to escape to the left (Figs. 1, 2) to an extent corresponding to the spacing of two adjacent rows of setting pins by the action of a spring 14 (Fig. 2) each time a key is struck, so that the rows of setting pins pass in succession over the ends of the intermediate levers 2 and the pawls 34 pass in succession over the lug 35 on the lever 10.

Figure 6:
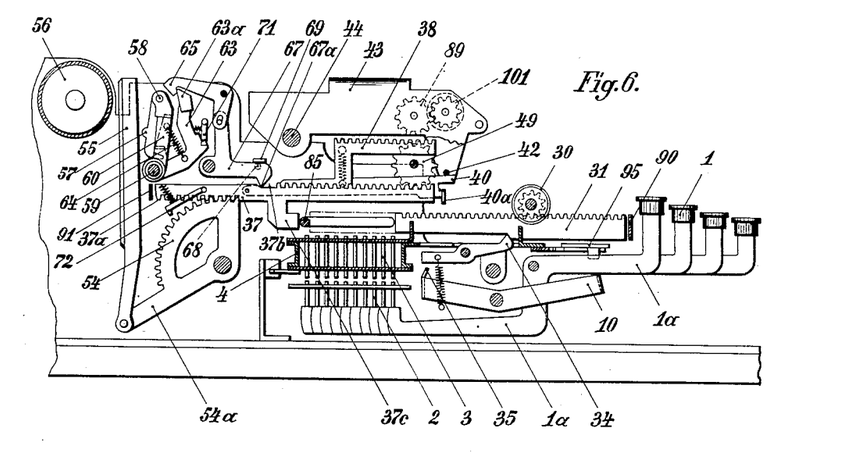
Fig. 6 is a longitudinal section through the entire machine, with the parts in the initial position.

The ratchet mechanism is actuated by the lever 10 (Fig. 6) arranged below the key levers 1a (Fig. 6). When any of the keys 1 is struck, the corresponding key lever 1a depresses the lever 10, which in turn depresses the arm 11a of a lever 11 (Fig. 4) and thus turns the lever 11 about the pivot 11b. A presser bar 13 which in turn rocks a pawl 8 is articulated at 12 to the lever 11. The pawl 8 actuates the two ratchet pawls 6, 7 in the desired manner.

The carriage 4 is returned to its original position, when, to effect an addition or a subtraction, the handle 15 is rocked forwardly and backwardly. The movement of the handle 15 is transmitted, by intermediate members 16, 17, 18 (Figs. 1 and 13), a shaft 45a, a one-armed lever 19 (Figs. 1 and 5), and a thrust bar 20, to a thrust pawl 23. The bar 20 has an arm 20a (Fig. 5) by which it is guided in a member 21 mounted in the base of the machine. The thrust pawl 23 is pivoted on a pin 22 and bears, under the action of a spring 24, against a stop 25 on the thrust bar. As long as the handle 15 is in normal position, the thrust pawl 23 is held in the position shown in dotted lines in Fig. 5 because the arm 23a of the pawl 23 bears against a pin 23b on the machine frame. When the handle is moved forwardly the bar 20 is moved to the right (Fig. 5) whereby the arm 23a of the pawl 23 is raised by the pin 23b passing into the position shown in full lines in Fig. 5. When the handle 15 is returned to normal position and the bar 20 with pawl 23 moves to the left in Fig. 5, the pawl encounters an arm 26a on a driver lever 26 (Figs. 1, 2, 5) pivoting on a pin 27 and having an arm with a forked end 26b engaging a pin 28 on the carriage 4. The rocking movement of the lever 26 forces the carriage 4 back into the original position (Fig. 1), whilst, at the same time, the pins 3, set at the beginning of the operation, are forced back into their original position, sliding under a member 29 provided with a bevel. Shortly before the handle 15 returns to its initial position the arm 23a of the pawl 23 again encounters the pin 23b on the machine frame, whereby the pawl is restored to the position shown in dotted lines in Fig. 5. If a new number is now set up in the carriage 4 and the latter moves from its normal position, the arm 26a of the lever 26 can move freely over the pawl 23. The return of the setting members 31 will be described later.

Figure 7:
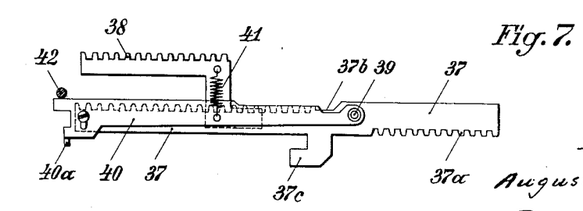
Fig. 7 shows the arrangement of an actuating rack.
Figure 8:
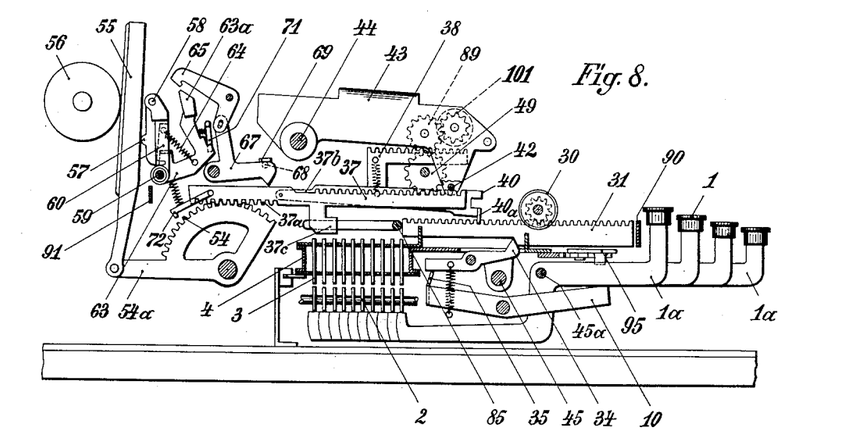
Fig. 8 is a view corresponding to Fig. 6 and shows the position of the parts when the operating handle is drawn forward, shortly before the printing of a calculated value.
Figures 9, 10, 11:
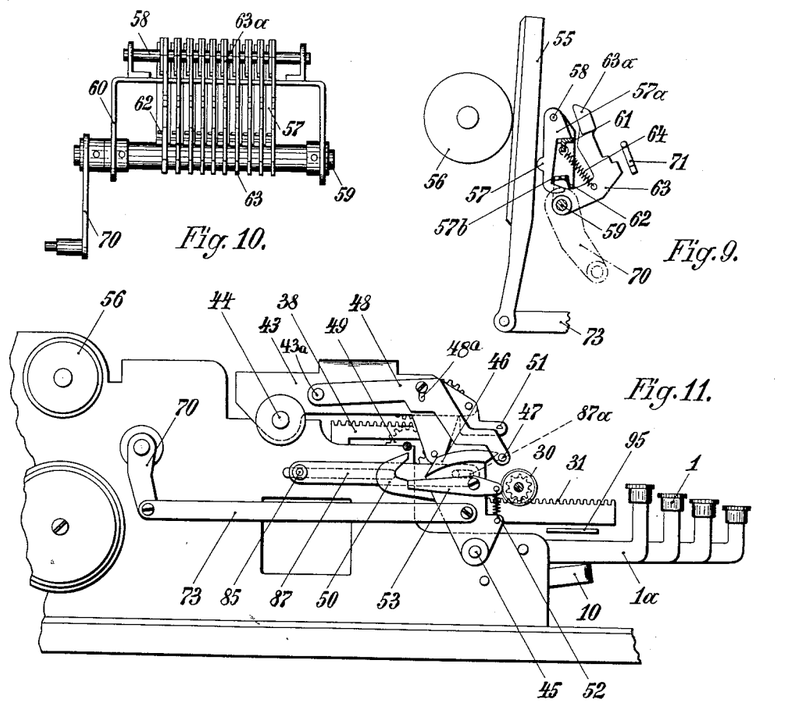
Fig. 9 shows the change in position of the parts of the printing mechanism after the impression.
Fig. 10 represents details of the printing mechanism.
Fig. 11 is a side elevation of the drive for the control of the accumulator.

Driving or transmission racks 37 (Figs. 1, 6, 7, 8, and 15) on which are riveted secondary racks 38, are provided in the same number and displaceable in the same direction and to the same extent as the setting members 31 in a frame 36 (Fig. 1) mounted in the frame of the machine. Secured on the transmission racks 37 are coupling members 40 (Figs. 1, 6, 7, 8) which are adapted to turn on pivot pins 39, and are swung by springs 41 (Fig. 7) in the direction of a member 42 (Figs. 6 and 8) on a frame 43 carrying an accumulator 101, said frame being disposed above the racks 37 and pivotally mounted on a shaft 44. The accumulator 101 can be raised and lowered by turning the accumulator frame about the shaft 44 and thus brought into or out of engagement with the racks 38 by means of the intermediate pinions 89. The accumulator 101 is raised and lowered by means of a curved member 46 (Figs. 11 and 12) mounted on a shaft 45 which is actuated through intermediate members 92, 93, 94 (Fig. 1) by a shaft 45a, which also effects the return movement of the carriage 4 and is actuated in turn by the handle 15. Fig. 11 shows the member 46 in its normal position. When the forward movement of the handle 15 and of the curved member 46 begins, a forward wedge-shaped projection 46a on the latter engages a guide roller 47 (Fig. 11). When the movement of the member 46 is continued the roller 47 is forced downwards to such an extent as to allow the under side 46b of the curved member 46 to move over the roller 47. The roller 47 is fixed to a lever 48, pivotable for a distance determined by a pin and slot guide 48a about a pin 43a on the accumulator frame 43. The lever 48 causes the accumulator 101 to descend as the movement of the curved member continues, and to engage, through the intermediate pinions 89, with the rack 38. The member 42 mounted on the accumulator frame and descending with the accumulator simultaneously brings angular projections or stops 40a of the coupling members 40 into engagement with the teeth of the setting members or control racks 31 (Fig. 8).

Figures 12, 14:
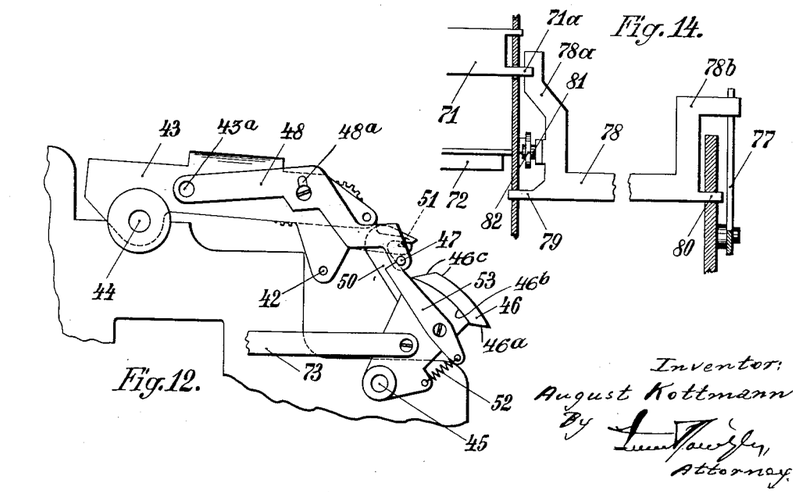
Fig. 12 shows the accumulator, with its control members in position after being coupled, to the actuating members.
Fig. 14 is the front elevation of a detail of a control member.

Together with the curved member 46 a positive movement is imparted to a riveted hook 50 (Figs. 11, 12) which engages behind a pin 51 provided on the accumulator frame and thus retains the accumulator in the coupled position (Fig. 12).

At the same moment that the locking hook 50 engages behind the pin 51, the under side 46b of the curved member 46 has passed out of contact with the guide roller 47 of the lever 48. The roller 47 and lever 48 are forced up (Fig. 12) at the same moment by a lever 53 attached to the curved member 46 and under the tension of a spring 52, so that during the return of the handle into its original position, the guide roller 47 runs back over the upper surface 46c of the curved member. Though the lever 48 is lifted the accumulator is held in its downward position by the hook 50 and the pin 51. Only when the handle 15 begins its return movement does the hook 50 free the pin 51 whereby the accumulator is returned into neutral position by suitably disposed springs (not shown).

Consequently, during the forward movement of the handle 15, the accumulator is brought into engagement with the racks 38, and is disengaged during the return movement. Similarly during the forward movement of the handle, the actuating racks 37, 38 are coupled with the setting member 31 by the stops 40a of the coupling members 40 actuated by the accumulator frame 43 through the member 42, the coupling being disengaged in the return movement.

Figure 13:
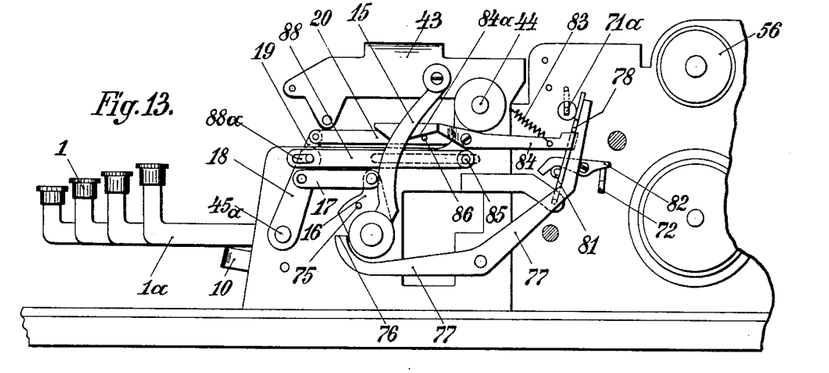
Fig. 13 is a side elevation showing the parts in their position for addition.

When the handle 15 is moved forward, a driver bar 85 (Figs. 1, 2, 6, 8, 11) is advanced the distance corresponding to the numerical value "9" by connecting rods 87, 88 (Figs. 11, 13). By this means all the setting members 31 previously set in accordance with the items to be added, are returned to the zero position. Thereby the actuating racks 37 coupled to the setting members 31 by the coupling members 40 are moved through a distance corresponding to the amount set. Excessive movement is prevented by a limiting bar 90 (Figs. 6 and 8), which is mounted in the carriage 4 transversely in front of the ends of the setting members 31 and stops the latter from being moved beyond the zero position.

As soon as the handle 15 has reached the end of its forward stroke the accumulator 101 comes out of engagement with the transmission racks 37, 38 as already described and the setting members 31 are uncoupled from the actuating racks, said members and the numerical control rollers 30 being thus again set to zero.

In the return stroke of the handle 15 and driver bar 85 into the original position, the latter encounters hooked projections 37c (Figs. 6, 7, 8) of the racks 37 and pushes the latter back into the original position (Fig. 8). Excessive movement is prevented by a limiting bar 91 (Figs. 6, 7, 8) mounted in the frame 36 transversely across the ends of the racks 37 which prevents them from being moved beyond the original position. Consequently, the movement of the actuating racks 37, 38 is wholly positive no springs being employed therefore.

When the setting members are in the position corresponding to the numerical value "9" the driver 85 is closely engaged between the opposing surfaces of the hooks 37c and setting members 31. When said members are set for the value "0" the driver can reciprocate between the two surfaces to an extent corresponding to the value "9" without displacing the racks 37 or the members 31. When the member 31 is set in accordance with the value "3" the driver 85 describes at first, at the beginning of both the forward and return strokes, an idle movement corresponding to the value "6" and then pushes the setting member 31, or the driving rack 37 back into the original position. The driver 85 therefore actuates all the driving racks 37 by the aid of two stops (hook 37c and coupling stop 40a) that are provided thereon which stop 37c and the left-hand end of the setting member 31 lie in the path of the driver, the hook 37c being fixed on the rack 37 and the stop 40a being engaged with the member 31 when key-set.

The member 85 and the setting members 31 may thus be regarded as constant stroke and variable stroke reciprocatory members respectively, of drive transmission means for differentially operating the several racks 37 from a single handle 15.

The drawbars 87 and 88 moving with the driver 85 are connected by means of longitudinal slots 87a, 88a (Figs. 11 and 13) with the arm 18 and the curved member 46 of the shafts 45a and 45. Consequently, at the beginning of the forward and return strokes, the handle 15 describes a certain movement during which the driver 85 is not moved. During this movement, the accumulator 101 is brought respectively into and out of engagement and the setting member coupled with or uncoupled from, the driving racks. These operations therefore proceed with the driver 85 at rest.

Intermediate pinions 49 (Figs. 6, 8, 15, 16) are in engagement with the transmission racks 37. The upper portions of the toothed rims of the se intermediate pinions 49 are on a level with the gear teeth of the racks 38 riveted on the transmission racks 37. The accumulator 101 is laterally displaceable to a slight extent. When it is pushed towards the right, the intermediate pinions 89 of the accumulator engage with the racks 38 and when the accumulator is pushed towards the left, they engage with the intermediate pinions 49 of the gear driving the accumulator. In the former case, the action is one of addition, and in the latter case one of subtraction.

Figure 17:
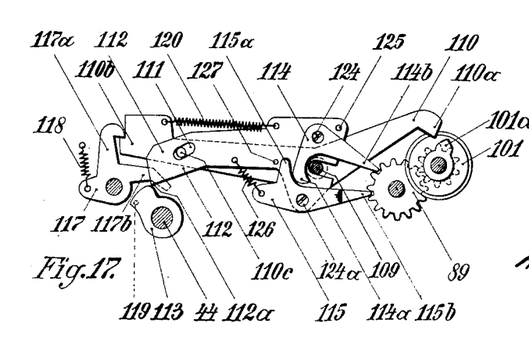
Fig. 17 shows the tens carrying mechanism as operating during subtraction.

To provide the lateral displacement of the accumulator 101, the numeral wheels thereof (Figs. 15, 16, 17) are disposed, with the corresponding intermediate pinions 89 and locking pawls 103, in a frame 104, which, in turn, is slidably mounted in a frame 43 adapted to swing on a cross shaft 44. The frame 104 has lateral pins 107 sliding in gaps in the cheeks of the frame 43. At the same time, the numeral wheels of the accumulator 101 are guided into window openings 129 in the cover plate 130.

Figure 19:
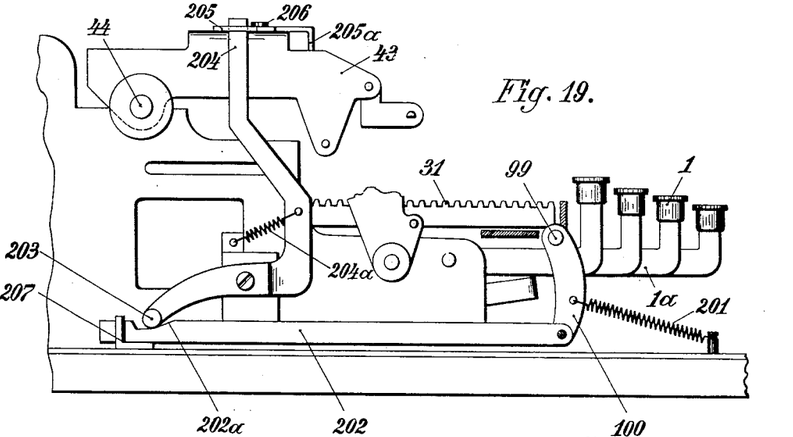
Fig. 19 is a side elevation of a part of the machine showing the position of certain parts required in subtraction.
Figure 20:
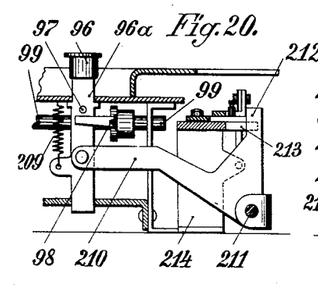
Figs. 20 and 21 are two views of the minus key with certain parts co-operating therewith.
Figure 21:
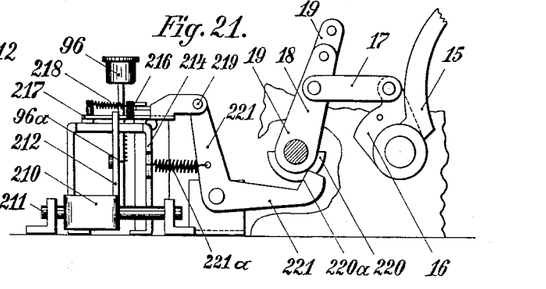

In changing over to subtraction, the lateral displacement of the frame 104 is effected by depressing a minus key 96 (Figs. 18, 20, 21) provided on the keyboard, said key rocking a lever 98, shaft 99 and lever 100 (Fig. 19) by means of the pin 97 disposed on its stem 96a. The lever 100 produces a lateral displacement of a connecting bar 202, guided in a bracket 207, against the pull of the spring 201. The bar 202 has a bevel 202a which, on the minus key 96 being struck, is pushed under a roller 203 on a lever 204. The displacement of the bar 202 lifts the roller 203 and turns the lever 204 against the action of a spring 204a.

The lever 204 engages in a fork 205b (Fig. 18) of a lever 205, which is pivotally mounted on pin 206 on the frame 43 of the accumulator, and engages with its other arm 205a, on the one cheek 104a of the frame 104 that is to be displaced laterally. Consequently, depressing the minus key 96 moves the frame 104 to the right against the spring 116, the machine being thereby changed over to effect subtraction.

The minus key 96, which is constrained by the spring 209 (Fig. 20) to rise again directly after being depressed is locked in the bottom position, by a locking device, until the subtraction is at an end. With this object, a lever 210 (Figs. 18, 20, 21, 22) is articulated to the stem of the minus key, so as to pivot on an axis 211, which lever has an arm 212 engaging in a slot 213 of a U-shaped holder 214.

Figure 18:
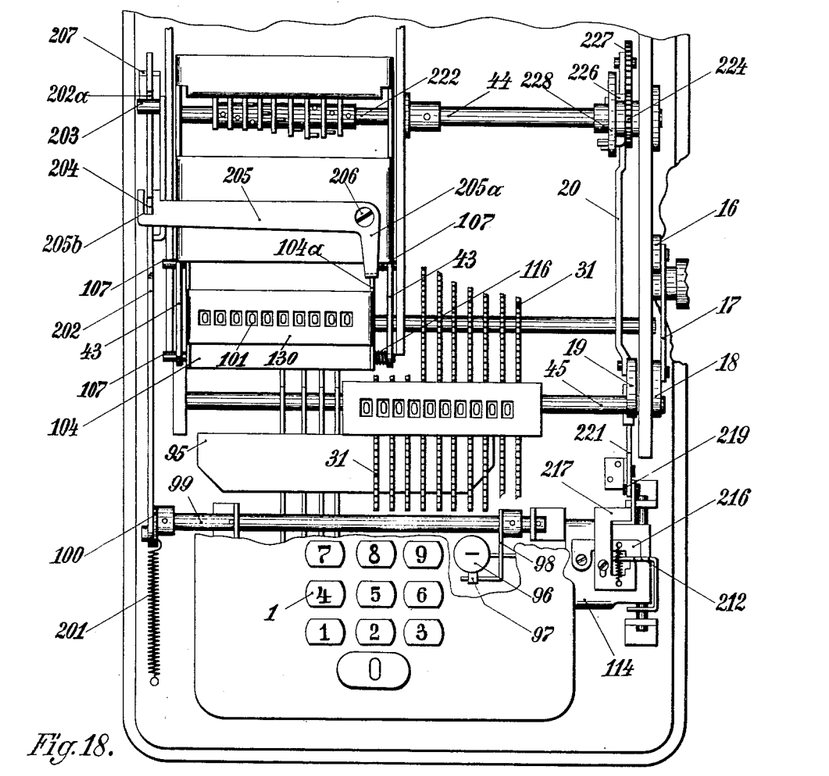
Fig. 18 shows the plan of the parts required for carrying over the tens, and for the minus setting of the accumulator.
Figure 22:
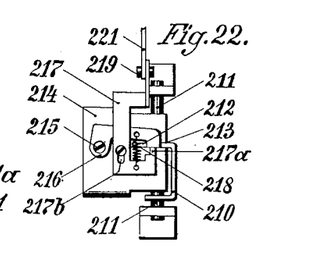
Fig. 22 shows the locking members allocated to the minus key, in the locking position.

The holder 214 carries a pawl 216, adapted to turn on a pin 215, and a locking slide 217 guided by a slot 217b. Both are drawn together by a spring 218. When the minus key is not operated, and the handle is in neutral position, the spring 218 draws the pawl 216 and the projection 217a of the slide 217 towards the lateral faces of the arm 212 of the lever 210 (Fig. 18). When the minus key 96 is depressed, the arm 212 in Figs. 18 and 22 is moved slightly towards the left, whereupon, as shown in Fig. 22, the pawl 216 engages behind the arm 212 and locks the key 96 in bottom position.

Articulated to the pawl 217 at 219 is a lever 221 (Fig. 21) which is influenced by a curved cam 220 moved by the handle 15 through the rods 16, 17, 18, 19.

On the handle 15 being operated in performing subtraction, and the curved surface 220 moved with it, the control lever 221, lying in a notch 220a in said cam is forced out of the notch against the action of the spring 221a and now slides over the periphery of the cam. By these means the slide 217 and the pawl 216 (Fig. 22) are raised, so that the ascending pawl 216 releases the arm 212 of the lever 210. Said arm 212 (Fig. 22) can therefore spring a little towards the right, but in so doing it bears against a projection 217a on the slide 217 and is retained thereby until the return of the handle 15 into the original position causes the end of the control lever 221 to re-engage in the notch 220a, under the influence of the spring 221a. By this means the slide 217 (Fig. 22) is again slightly depressed into its original position represented in Fig. 18, so that the arm 212 of the lever 210 is released.

The lever 210, the minus key 96, and all the parts displaced by the latter, then return to their original position. In particular, the frame 104 is also returned to its left-hand end position by the springs 116, thus re-setting the machine for addition.

The upper edge of the cover plate 130 containing the window openings 129 (Fig. 16) is provided with guide slots 108, in which levers 110 for preparing tens-carry—rotatably mounted about an axis 109 (Figs. 15, 16, 17) and laterally displaceable within certain limits—are guided in such a manner that, during the change over from addition to subtraction, they share the lateral shifting of the frame 104 and their ends 110a are always within the sphere of movement of tens-carry preparing lugs 101a on the numeral wheels 101.

If, during addition or subtraction, one of the numeral wheels 101 of the accumulator passes from "9" to "0", or from "0" to "9", the cam 101a on the numeral wheel will turn its allotted preparatory lever 110 causing its rear extremity 110b to press on an arm 117b of a pawl 111 and, aided by the spring 118, brings said pawl into a position, in which it locks the lever 110 in the preparatory position.

Pins 110c on the lever 110 engage longitudinal slots 111 in slides 112 which are guided by transverse notches on a shaft 109. The corners 112a (Fig. 17) of slides of those levers 110 that are locked in the preparatory position lie within the sphere of movement of cams 113, which are offset on the shaft 44 round which the frame 43 of the accumulator 101 swings, and therefore the shaft 44 is also the driving shaft of the tens carrying mechanism. It is actuated after the values have been transferred into the accumulator and the latter is again brought out of engagement with its actuating mechanism, the shaft 44 making one clockwise revolution for each operation of the machine. The cams 113 then displace, to the right, the slide 112 of any lever 110 (Figs. 15 and 17) that is locked in the preparatory position.

Figures 23, 24:
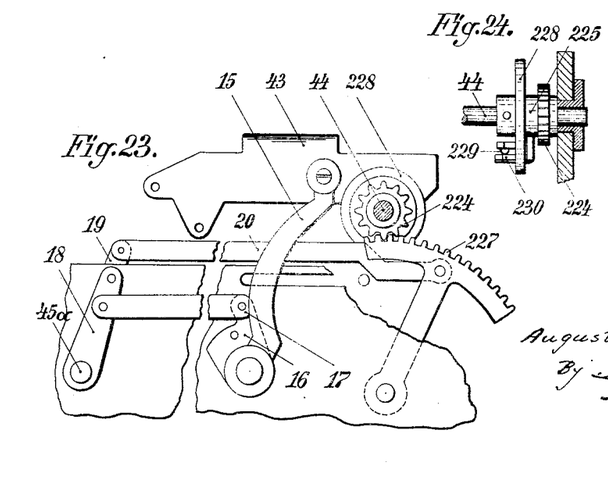
Fig. 23 is an elevation of the drive for the tens carrying shaft.
Figs. 24 and 25 are two views, partly cut away, of the actuating members seated on the tens carrying shaft.
Figure 25:
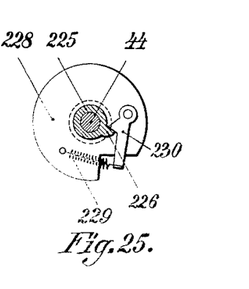

The drive of the tens carrying shaft 44 is shown in Figs. 23, 24, and 25. By means of rods 16, 17, 18, 19, 20 the handle 15 actuates a toothed sector 221, which gears with an idle pinion 224 on the shaft 44, and is provided with such a number of teeth that it imparts one revolution to the pinion, in one or the other direction, both during the forward and return movement of the handle. The hub 225 (Fig. 25) of the pinion 224 carries a driver tooth 226 which lies close in front of a disc 228, keyed on the tens carrying shaft 44 and provided with a driver pawl 230 which is under the tension of a spring 229. When the machine is in neutral position, said pawl lies in the position, in relation to the driver tooth, shown in Fig. 25. During the forward movement of the handle 15, the pinion 224 and the driver 226 (Fig. 25) describe one clockwise revolution. The pawl 230, disc 228 and shaft 44 do not share this movement, but the driver tooth 226 describes an independent clockwise revolution at the end of which it slides under the pawl 230, so that the relative position of driver 226 and pawl 230 is again the same as shown in Fig. 25.

During the return stroke of the handle 15, the pinion 224 and driver tooth 226 are turned in the opposite direction and carry along the pawl 230, disc 228 and shaft 44, which latter describes the revolution necessary for actuating the tens carrying slide 112.

Figure 15:
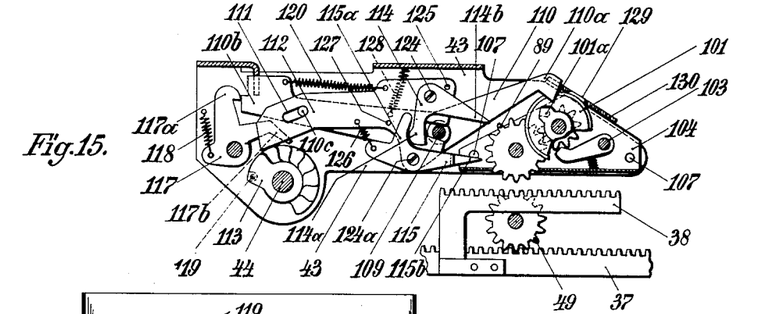
Fig. 15 is a side elevation of the accumulator with the tens-carrying means in their initial or neutral position, in conjunction with the main parts of an accumulator drive designed as a rack drive.
Figure 16:
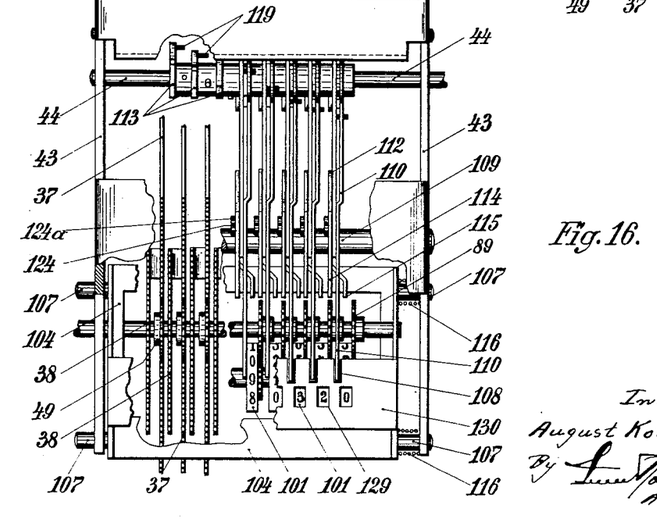
Fig. 16 is a plan of the arrangements according to Fig. 15, the accumulator being shown on the right half of the figure, and the racks of the accumulator drive on the left, certain plates, which would otherwise conceal the interior of the machine, being cut away.

Pivotally mounted on pins 124 and 124a on the slides 112, are two tens carrying pawls 114, 115 (Figs. 15, 17), which coact by means of lever arms 114a and 115a and, when the tens carrying device is out of action, are held by the spring 126 in the position shown in Fig. 15, in which the pawl 114 bears against the pin 125. The tip 115b of the lower pawl 115 is bent sideways to the same extent as the frame 104 is displaced laterally during the change over from addition to subtraction. The two pawls 114 and 115 are so arranged that, when the frame 104 is in the left position (referred to Fig. 16), that is to say, set for addition, the intermediate pinions 89 lie in the same vertical plane as the tips 114b of the pawls 114, and when the frame 104 is in the right-hand position, that is, set for subtraction, said pinions 89 are in the same plane as the tips 115b of the pawls 115, and—reckoning from the accumulator order wherein the preparatory cam 101a has become operative—the pawls 114 and 115 engage in the intermediate pinion 89 of the next higher order of the accumulator.

If, in an order, a carry has been made ready and the slide 112 is pushed towards the right by a cam 113 (Figs. 15 and 17), the pawls 114 and 115 are at first pushed only in a straight line towards the right until the pawl which is operative for the time being has engaged in a tooth gap of the corresponding intermediate pinion 89. After the slide 112 has been moved a certain distance towards the right, the arm 114a of the pawl 114 strikes against the shaft 109, whereby the arms 114a and 115a of the pawls 114 and 115 are prevented from moving farther to the right. During the further movement of the slide 112 towards the right the pawls 114 and 115 are consequently swung round the pins 124 and 124a in such a manner that the ends 114b and 115b move like the jaws of a closing tongs, that is to say, the tip 114b of the pawl 114 descends, and the tip 115b of the pawl 115 ascends.

When the frame 104 is in the left-hand position, and the machine is therefore set for addition, the pawl 114 engages in the pinion 89, so that the numeral wheel is turned in the additive direction a distance corresponding to one unit. With the frame 104 in the right-hand position, and the machine therefore set for subtraction, the pawl 115 engages in the intermediate pinion 89 and turns the numeral wheel in the subtracting direction.

Towards the end of the operative movement of the pawls 114 and 115, the arm 115a of the pawl 115 strikes against a pin 127, whereby any over-running movement of the pawls 114 and 115, and the numeral wheels they actuate, is reliably prevented.

At the same moment that the arm 115a of the pawl 115 bears against the stop pin 127, the cam 113 of the shaft 44 slides off the edge 112a of the slide 112. During the further rotation of the shaft 44, a pin 119 on the cam 113 strikes against the downwardly bent end of an arm 117b of the locking pawl 117, thus forcing the latter out of the locking position. The preparatory lever 110 then returns to its original position, under the pull of the spring 128, and the slide 112 returns to neutral position under the pull of the spring 120.

The rear ends of the lower edges of the transmission racks 37 are provided with gear teeth 37a (Figs. 6, 7, 8) which are engaged by the toothed quadrants 54, these latter, in turn, carrying on arms 54a type carriers 55 of the printing mechanism. In proportion as the racks 37 are moved by the setting members 31 with which they are coupled the type carriers are also raised, in a positive manner, so that, in accordance with the setting of the racks and type carriers, the values transferred into the counting mechanism can be printed on a strip of paper clipped on to a platen 56 (Fig. 8).

The impression mechanism of the printing device (Figs. 1, 6, 8, 9, 10) consists of a number of press pawls 57, corresponding to the number of orders in the accumulator, said pawls being adjacently disposed on a shaft 58 fixed in a frame 60 (Figs. 6, 8, 10) adapted to swing on a shaft 59, parallel with the axis of the platen. The movement of these pawls about the shaft 58 in the direction of the platen is restricted by a bar 61 (Fig. 9), against which the projections 57a of the pawls 57 bear. Pressure levers 63 carrying weights 63a are allotted to the pawls 57, and are controlled by springs 64, but are normally held in a neutral position by locking pawls 65 (Figs. 6 and 8). In addition a locking bar common to all the pressure levers is mounted in the frame of the machine and engages in notches in the levers 63, being released just before the printing operation by devices which will be described later.

The locking pawls 65 form part of the zero-printing device and coact with releasing pawls 67, the number of which is the same as that of the transmission racks 37. When the corresponding transmission racks are in neutral position, the tip 67a of each releasing pawl 67 engages in a recess 31b of the transmission rack (Fig. 6).

As soon as the transmission rack leaves its original position, its unrecessed portion passes under the tip of the pawl, thereby turning the pawls 67 and 65 and effecting the release of the pressure lever 63 (Fig. 8). On their right side, the pawls 67 are provided with pins 68, whilst the left sides are provided with lugs 69 of such dimensions that, in each case, the pin 68 of each pawl lies under the lug of the next lower, adjacent pawl, so that if any pawl be raised by its allotted transmission rack all the pawls lying to the right of it in Fig. 1 will also be raised whereas the pawls on the left will remain in the locked position. In printing a value containing a smaller number of figures than there are orders in the printing mechanism, the pawls 65, 67 prevent the impression of "0's" in front of the first numeral of the multi-numeral value to be printed, whereas zeros inside the row of numerals are printed.

During the forward movement of the handle 15, the frame 60, with the press pawls 57, is swung, by means of the shaft 45a, shaft 45, curved member 46, drawbar 73 (Figs. 1 and 11) and the arm 70, towards the platen 56, in such a manner that the press pawls 57 bear against the back of the type carriers 55 and bring the latter so close up to the platen 56 that the type characters almost touch the paper, whereas the pressure levers 63 are held at first in their original position in relation to the frame of the machine by the bar 71. During the swinging of the frame 60, tension is applied to the springs 64 of the pressure levers 63, which springs are attached at one end to the cross bar 61 of the frame 60. Shortly before the handle 15 reaches the end of its forward stroke, a striker pin 75 (Fig. 13), which is arranged on the lever arm 16, connected to the handle, comes into contact with a surface 76 on a two-armed lever 77 and deflects the latter in such a manner that its second arm moves a pivotal release member 78 (Figs. 13, 14). The arm 78a of the member 78, which turns on two pivots 79 and 80, moves a pin 71a on the bar 71 when said member is deflected and swings the bar 71 out of the locking position. A roller 81, arranged on an angular bend of the same arm 78a influences a rocking member 82 (Fig. 13) so that the latter forces a straight-edge 72 (Figs. 13, 6, 8) into the toothed sector 54 (Fig. 8). These last described members are relatively arranged so that, in the first place, the straightedge 72 engages in the tooth gaps of the quadrant 54, after which the arm 78a comes in contact with the pin 71a and effects the release of the spring-controlled pressure lever 63. The forward movement of the release member 78 brings a locking pawl 84 (Fig. 13), controlled by a spring 83, into position behind the arm 78b, and locks the release member until the handle is moved back again.

At the moment the locking bar 71 is being released, the springs 64 swing the pressure levers 63 on the shaft 59 and impart a high velocity to the weights 63a (Fig. 9). The bent surfaces 62 of the levers 63 then slide downwards on the rear surfaces 57b of the press pawls 57 and, transforming the kinetic energy of the weights 63a and levers 63 into pressure, press the pawls 57 and type carriers 55, slowly but forcibly, against the surface of the paper so that the impression on the paper is produced less by impact than by uniform pressure.

The thrust bar 20, moved by the handle 15 and actuating the return mechanism of the carriage of the setting members, carries a pin 86 (Fig. 13) which, at the beginning of the return stroke of the handle 15, lifts the curved arm 84a of the locking pawl 84 and thus frees the locking of the release member 78, by which means the straightedge 72, obeying the pull of a spring 72a (Fig. 8) detaches itself from the teeth of the sector 54, and the locking bar 71 is released again. During the further return movement of the handle 15, the driver 85 actuated thereby pushes the transmission racks 37 back into the original position, as already described thus returning the type carriers into their original position.

The frame 60 carrying the printing mechanism is also swung back during the return of the handle 15 into its original position by means of the shaft 45a, shaft 45, curved plate 46 and drawbar 73, the pressure levers 63 being again locked by the descent of the locking pawls 65, whilst, at the same time, the locking bar 71 is enabled by spring tension to engage in the notches in the pressure levers.

The return of the pawls 65 into locking position is rendered possible through the return of the allotted driving racks into neutral position so that the release or control pawls 67 are able to drop into the recesses 37b provided in same, thereby enabling the pawls 65 to move into the locking position.

I claim:

1. A calculating machine comprising an accumulator with numeral wheels, ordinal actuating means for the accumulator including reciprocatory racks, a reciprocatory drive member, a carriage traversable relatively to the actuator racks, keys for setting up digit values, digit setting racks in the path of said drive member and movable in said carriage parallel to the actuator racks by amounts determined by said keys, and pairs of stops on said actuating racks, one stop being adjustable with respect to its rack to couple the latter to one of said key set digit setting racks, and the other stop of each pair being fixed on its rack and cooperating with the drive member in restoration of said rack.

2. A calculating machine comprising an accumulator with numeral wheels, ordinal actuating means for the accumulator including reciprocatory racks, a reciprocatory drive member, a carriage traversable relatively to the actuator racks, keys for setting up digit values, digit setting racks in the path of the drive member and movable in said carriage parallel to the actuator racks by amounts determined by said keys and adapted to be restored to initial position by said drive member on its forward stroke, pairs of stops on said actuating racks, one stop of each pair being adjustable relative to its rack to couple the same to a digit setting rack and the other stop of each pair being fixed on its rack and cooperating with the drive member in restoration of said actuating racks on the return stroke of said drive member, and means operative during the forward stroke of the drive member for producing coupling of actuator racks with the setting racks and for uncoupling said racks after their restoration at the end of said stroke.

3. A calculating machine comprising an accumulator with numeral wheels, ordinal actuating means for the actuator including reciprocatory racks, a reciprocatory drive member, means actuated by said drive member for moving the accumulator into and out of engagement with the actuator racks, a carriage traversable relatively to the actuator racks, keys for setting up digit values, digit setting racks in the path of the drive member and movable in said carriage parallel to the actuator racks by amounts determined by said keys and adapted to be restored to initial position by said drive member on its forward stroke, pairs of stops on said actuating racks, one stop of each pair being adjustable relative to its rack to couple the same to a digit setting rack and the other stop of each pair being fixed on its rack and cooperating with the drive member in restoration of said actuating racks on the return stroke of said drive member, and means on the accumulator operative during the forward stroke of the drive member for producing coupling of actuator racks with the setting racks and for uncoupling said racks after their restoration at the end of said stroke.

4. A calculating machine comprising an accumulator with numeral wheels, ordinal actuating means for the accumulator including reciprocatory racks, a reciprocatory drive member, a carriage traversable relatively to the actuator racks, keys for setting up digit values, digit setting racks, in the path of said drive member and movable in said carriage parallel to the actuator racks by amounts determined by said keys, an indicator in said carriage cooperating with the setting racks, and pairs of stops on said actuating racks, one stop being adjustable with respect to its rack to couple the latter to one of said key set digit setting racks, and the other stop of each pair being fixed on its rack and cooperating with the drive member in restoration of said rack.

5. A calculating machine comprising an accumulator with numeral wheels, ordinal actuating means for the accumulator including reciprocatory racks, a reciprocatory drive member, a carriage traversable relatively to the actuator racks, keys for setting up digit values, digit setting racks in the path of said drive member and movable in said carriage parallel to the actuator racks by amounts determined by said keys and adapted to be restored to initial position by said drive member on its forward stroke, pairs of stops on said actuating racks, one stop of each pair being adjustable relative to its rack to couple the same to a digit setting rack and the other stop of each pair being fixed on its rack and cooperating with the drive member in restoration of said actuating racks on the return stroke of said drive member, means operative during the forward stroke of the drive member for producing coupling of actuator racks with the setting racks and for uncoupling said racks after their restoration at the end of said stroke, and means common to all the setting racks for halting them in initial position.

6. A calculating machine comprising an accumulator with numeral wheels, ordinal actuating means for the accumulator including reciprocatory racks, a reciprocatory drive member, a carriage traversable relatively to the actuator racks, keys for setting up digit values, digit setting racks in the path of the drive member and movable in said carriage parallel to the actuator racks by amounts determined by said keys and adapted to be restored to initial position by said drive member on its forward stroke, pairs of stops on said actuating racks, one stop of each pair being adjustable relative to its rack to couple the same to a digit setting rack and the other stop of each pair being fixed on its rack and cooperating with the drive member in restoration of said actuating racks on the return stroke of said drive member, means operative during the forward stroke of the drive member for producing coupling of actuator racks with the setting racks and for uncoupling said racks after their restoration at the end of said stroke, means common to all the setting racks for halting them in initial position, and means common to all the actuator racks for halting them in initial position when they are restored thereto by the return stroke of the drive member.

7. A calculating machine comprising an accumulator, ordinal actuating means including reciprocable racks for the accumulator, keys for setting up digit values, ordinal racks movable under the control of said keys to corresponding digital settings, means for coupling the ordinal actuating racks with corresponding ordinal key controlled racks when these are in any key set position and for subsequently decoupling said racks from each other, and transmission means operable in one direction to return the key controlled racks to normal position before decoupling with resulting operation of the accumulator and operable in the other direction after decoupling to restore the actuator racks.

8. A calculating machine comprising an accumulator, actuating means including a group of ordinally disposed reciprocatory racks for the accumulator, drive transmitting means including a corresponding group of ordinally disposed members of variable stroke cooperating with said racks and a constant stroke member, digit setting means for determining the strokes of said first mentioned members according to digit values, and pairs of stops on said racks one stop of each pair being movable relatively to its cooperating drive transmitting member to couple the latter to the rack after said member has its stroke determined by the setting means and the other stop of each pair cooperating with the constant stroke member in its movement in one direction to restore the rack after an operation, the movement of the constant stroke member in the opposite direction being transmitted through the coupled variable stroke members and racks to the accumulators.

9. A calculating machine comprising an accumulator, ordinal actuating means including reciprocable racks for the accumulator, keys for setting up digit values, ordinal racks movable under the control of said keys to corresponding digital settings, means for coupling the ordinal actuating racks with corresponding ordinal key controlled racks when these are in any key set position and for subsequently decoupling said racks from each other, transmission means operable in one direction to return the key controlled racks to normal position before decoupling with resulting operation of the accumulator and operable in the other direction after decoupling to restore the actuator racks, and drive means operating said transmission means and also the coupling and decoupling means.

AUGUST KOTTMANN.